(12) United States Patent
Chou (10) Patent No.: US 10,368,679 B2
(45) Date of Patent: Aug. 6, 2019

(54) SLOW COOKER

(71) Applicant: T.F. ELECTRICAL TECHNOLOGY (SHENZHEN) CO., LTD., Shenzhen, Guangdong (CN)

(72) Inventor: Wenhung Chou, Guangdong (CN)

(73) Assignee: T.F. ELECTRICAL TECHNOLOGY (SHENZHEN) CO., LTD., Shenzhen, Guangdong (CN)

(*) Notice: Subject to any disclaimer, the term of this patent is extended or adjusted under 35 U.S.C. 154(b) by 818 days.

(21) Appl. No.: 14/900,264

(22) PCT Filed: Jun. 23, 2014

(86) PCT No.: PCT/CN2014/080500
§ 371 (c)(1),
(2) Date: Dec. 21, 2015

(87) PCT Pub. No.: WO2015/196328
PCT Pub. Date: Dec. 30, 2015

(65) Prior Publication Data
US 2016/0367061 A1    Dec. 22, 2016

(51) Int. Cl.
A47J 27/00    (2006.01)
A47J 36/24    (2006.01)
B21G 3/24    (2006.01)

(52) U.S. Cl.
CPC ......... *A47J 27/004* (2013.01); *A47J 36/2483* (2013.01)

(58) Field of Classification Search
CPC ................................. A47J 29/04; B61G 3/24
(Continued)

(56) References Cited

U.S. PATENT DOCUMENTS 2,657,580 A * 11/1953 Schroeder ............... G01K 7/34
                                                                374/155
5,217,262 A *  6/1993 Kurosaki ............. E05C 19/022
                                                                  292/6
(Continued)

FOREIGN PATENT DOCUMENTS

CN    2416834    1/2001
CN    2420953    2/2001
(Continued)

OTHER PUBLICATIONS

International Search Report filed in PCT/CN2014/080500.

*Primary Examiner* — Ibrahime A Abraham
*Assistant Examiner* — Spencer H. Kirkwood
(74) *Attorney, Agent, or Firm* — Rankin, Hill & Clark LLP (57) ABSTRACT

A slow cooker comprises a case; a control circuit component and an inner pot for receiving food are disposed inside the case; the inner pot is arranged inside the case in a pick-and-place manner; a temperature detection component for temperature detection is arranged on the sidewall of the inner pot, and a mount seat connected to the case is arranged at the bottom of the inner pot; a liftable heating apparatus is arranged on the mount seat; the heating apparatus comprises a heating component and a lifting mechanism which can drive the heating component upwards and downwards. A temperature detection component arranged in the slow cooker is capable of detecting the temperature in the inner pot precisely; a lifting mechanism arranged in the slow cooker is capable of adjusting the distance from the inner pot to preheat the inner pot, improving cooking efficiency.

19 Claims, 5 Drawing Sheets

(58) Field of Classification Search
USPC .......................... 99/403, 407, 410, 415, 337
See application file for complete search history.

(56) References Cited

U.S. PATENT DOCUMENTS

| | | | |
|---|---|---|---|
| 6,274,847 B1 | 8/2001 | Hlava et al. | |
| 8,181,926 B2 * | 5/2012 | Magno, Jr. | F24J 2/5258 |
| | | | 248/220.21 |
| 2008/0216668 A1 * | 9/2008 | Fraij | A47J 37/1266 |
| | | | 99/331 |
| 2010/0271909 A1 * | 10/2010 | Michaelson | G04F 10/00 |
| | | | 368/108 |

FOREIGN PATENT DOCUMENTS

| | | | |
|---|---|---|---|
| CN | 101161166 | | 4/2008 |
| CN | 202636599 | | 1/2013 |
| CN | 202636599 U | * | 1/2013 |
| CN | 103735147 | | 4/2014 |

* cited by examiner

SLOW COOKER

FIELD OF THE INVENTION

The invention relates to the field of kitchen electrical equipments, especially a slow cooker for cooking food.

BACKGROUND OF THE INVENTION

With the improvement of people's living standard, people's pursuit for cooking food is not merely limited to flavor, but more emphasized on nutritive value. However, some of nutrient composition is lost or becomes inactive unavoidably, and thus cannot be absorbed by people; furthermore, the high temperature may make the food become less fresh and tender. High temperature is not necessary for some food to be cooked thoroughly. Through long-time cook under a lower temperature (30° C.~95° C.), the food can still be cooked enough to be eaten, and the nutrient composition, as well as the freshness and tenderness of food will not be lost. Therefore, slow cookers come into market accordingly.

An inner pot of a slow cooker is not heated directly but through air between a heating apparatus and the inner pot which are spaced away from each other, and the food inside the cooker is heated through the thermal conductivity of the air. The technical means can meet the requirement of the way of cooking discussed herein.

For the slow cooker in the prior art, the means for detecting temperature are arranged at the heated position of the bottom of the cooker during cooking and cannot detect the temperature inside the cooler, which makes the detected temperature less accurate. Furthermore, the inner pot cannot be preheated by the heating apparatus, which makes the heating process be too long, or requires increasing power in order to speed up the heating process, thereby increasing the power consumption. Furthermore, different temperatures are required for different kinds of food, which cannot be properly adjusted by the slow cooker in the prior art.

SUMMARY OF THE INVENTION

The invention aims at overcoming the defects in the prior art, and provides a slow cooker with high temperature detection precision and accurate control, which ensures the quality of the cooked food, can preheat the inner pot, improves the cooking efficiency, has low energy consumption, and is environmentally protective.

The technical solutions is: a slow cooker for heating and cooking food, comprising a case; the case is provided therein with a control circuit component and an inner pot for receiving food; the inner pot is arranged inside the case in a pick-and-place manner; a temperature detection component for temperature detection is arranged on the sidewall of the inner pot, and a mount seat connected to the case is arranged at the bottom of the inner pot; a liftable heating apparatus is arranged on the mount seat; the heating apparatus comprises a heating component and a lifting mechanism which can drive the heating component upwards and downwards.

Specifically, the heating component includes a heating element, a thermal baffle, and a support superposed from top to bottom; the heating element is arranged above the thermal baffle through a supporting piece, and electrically connected to the control circuit component; an automatic alignment mechanism is arranged between the thermal baffle and the support.

Specifically, the automatic alignment mechanism includes a guiding shaft arranged on the support, and a through-hole arranged on the thermal baffle configured to be passed through by the guiding shaft. The guiding shaft is sheathed with a spring, and one end of the guiding shaft passes through the through-hole, an end of the guiding shaft which passes through the through-hole is connected to a nut.

Preferably, the heating element is composed of one or more coiled, winded or side-by-side arranged heating tubes; or the heating element is a heating panel.

Specifically, the lifting mechanism includes lever components and unlocking components; the lever components are divided into two groups and arranged on the mount seat diagonally; the unlocking components are divided into two groups correspondingly.

Specifically, the lever component includes a wane, a support axle, a compression bar, a support ear arranged on the mount seat, and a connect ear oppositely arranged at the bottom of the support; a first axle hole and a second axle hole are arranged at one end and a central portion of the wane respectively; the first axle hole is passed through by a spindle of which two ends pass through the connect ear; the support axle passes through the second axle hole; two ends of the support axle are mounted on the support ear; one end of the compression bar presses against the other end of the wane, and the other end of the compression bar presses against the bottom of the inner pot.

Specifically, a part of the mount seat at a side edge of the bottom of the inner pot is provided with a compression bar seat configured to be passed through by the compression bar; the compression bar seat is provided with a compression bar spring inside thereof which is passed through by the compression bar, one end of the compression bar presses against the bottom of the inner pot, while the other end presses against the tip of the wane.

Furthermore, the end of the compression bar which presses against the bottom of the inner pot is sheathed with a compression bar cap; the unlocking components are arranged at the end of the compression bar which presses against the wane.

Specifically, the unlocking components include a sliding block, an electromagnet and a push bar disposed inside the electromagnet; one end of the compression bar presses against the sliding block; the electromagnet is disposed on the mount seat at a side of the sliding block; the wane defines a mount hole configured to contain the sliding block, the mount hole is provided therein with a mount axle; the sliding block is slidingly sheathed around the mount axle; the sliding block is provided with an unlocking notch corresponding to one end of the compression bar; a part of the mount axle arranged between the sliding block and the mount hole is sheathed with a reset spring.

Specifically, the temperature detection component is detachably arranged on the inner sidewall of the inner pot, and includes a temperature sensor and a socket for holding the temperature sensor, the socket is fixedly mounted on the inner sidewall of the inner pot, one end of the temperature sensor is removably plugged in the socket, and the other end is connected to a pothook configured to be hooked at the edge of the inner pot; the temperature sensor is electrically connected to the control circuit component.

Specifically, the inner pot is a square pot; two corners of the mount seat are provided with lever components, and the other two corners are provided with support legs for supporting the inner pot.

The slow cooker provided by the present invention is provided with a temperature detection component inside the inner pot, and capable of directly detecting the temperature inside the inner pot; the temperature detection is accurate and thereby improves the accuracy of temperature control. At the same time, the heating apparatus beneath the inner pot is liftable and lowerable, which can preheat the inner pot directly, thereby improving the cooking efficiency, conserving energy, and protecting the environment. Moreover, the heat transmission distance between the heating component and the inner pot can be adjusted, which meets the requirements for different cooking time and makes the slow cooker be overall functional. The disclosed slow cooker has low energy consumption and is accurate on temperature control, which retains the nutrient composition of the food effectively, possesses high cooking efficiency, and food cooked by the slow cooker is tender and delicious, thereby bringing convenience to use.

DETAILED DESCRIPTION OF THE PREFERRED EMBODIMENT

The purpose, technical solutions and advantages of the invention will become more apparent with the following detailed specification in combination with the following drawings and embodiments. It should be understood that the specific embodiments described herein are merely intended to illustrate but not to limit the invention.

As shown in FIGS. 1-4, one embodiment according to the invention provides a slow cooker for heating and cooking food, which includes a case 1000; a control circuit component (not shown) and an inner pot 2000 for receiving food are arranged inside the case 1000. The inner pot is arranged inside the case 1000 in a pick-and-place manner to facilitate cleaning and use of the inner pot 2000. A temperature detection component 3000 for temperature detection is arranged on the sidewall of the inner pot 2000, and a mount seat 4000 connected to the case 1000 is arranged at the bottom of the inner pot 2000 and used for supporting the heating apparatus; a liftable heating apparatus 5000 is arranged on the mount seat 4000, the heating apparatus 5000 comprises a heating component 5100 and a lifting mechanism 5200 which can drive the heating component 5100 upwards and downwards so as to adjust the distance for heating the inner pot 2000 using the heating component 5100, and meet the requirements for different cooking time.

Specifically, as shown in FIGS. 1-4, in the actual use, the heating component 5100 will radiate heat upon being electrified, and thereby heat and cook the food inside the inner pot 2000. Under the control of the control circuit component, the heating component 5100 may keep the temperature of the inner pot 2000 within a predefined range of temperature so as to cook the food within the predefined range of temperature, thereby realizing a function of cooking food in a relatively lower temperature (30 ° C.~95 ° C.) with the slow cooker. In order to control the temperature inside the inner pot 2000 precisely, the temperature detection component 3000 for temperature detection is arranged on the inner sidewall of the inner pot 2000 directly so as to directly detect the temperature of the inner pot 2000 during cooking food, thereby controlling the temperature of the cooked food accurately, preventing the quality of the cooked food from being affected by too high or too low temperatures, and ensuring the quality of the cooked food. The technical solution does not place the temperature detection component at the cooked position of the bottom of the cooker as a traditional slow cooker, and thereby overcomes the defect of inaccurate temperature detection. At the same time, the heating component 5100 is arranged beneath the inner pot 2000, and is capable of rising and falling through the lifting mechanism 5200. During cooking, under the control of the lifting mechanism 5200, the heating component 5100 can be attached to the bottom of the inner pot 2000 directly so as to preheat the inner pot 2000, so that the inner pot 2000 reaches a predefined temperature faster; and as soon as the temperature detection component 3000 detects that the temperature of the inner pot 2000 has reached the predefined temperature, the lifting mechanism 5200 would be driven by the control of the control circuit component to change the position of the heating component 5100, and the heating component 5100 is detached away from the bottom of the inner pot 2000 and positioned at a location that is spaced from the bottom of the inner pot 2000 at a certain distance. Thus, the inner pot 2000 is heated slowly through air conduction to ensure that the food inside the inner pot 2000 is cooked in a relative lower temperature, which may retain the nutrient composition and fresh flavor. Furthermore, the distance between the heating component 5100 and the bottom of the inner pot 2000 can be adjusted according to the time requirement of cooking, different location relations can finally realize the control of the heating speed. By such arrangements, the temperature of the inner pot 2000 is precisely controlled. The provided lifting mechanism 5200 can improve the preheating efficiency of the inner pot 2000, the inner pot 2000 can be heated to a predefined temperature fast without increasing the power of the heating component 5100, which is thermal-energy efficient and environmentally protective.

The disclosed slow cooker can detect the temperature inside the inner pot 2000 directly through arranging a temperature detection component 3000 on the sidewall of the inner pot 2000, which improves the accuracy of the temperature detection, thereby ensuring the quality of the cooked food. Moreover, the disclosed slow cooker can preheat the inner pot 2000 directly through the liftable heating apparatus 5000, which reduces heating time, improves cooking efficiency, reduces electrical power consumption, and protects the environment.

Figure 1:
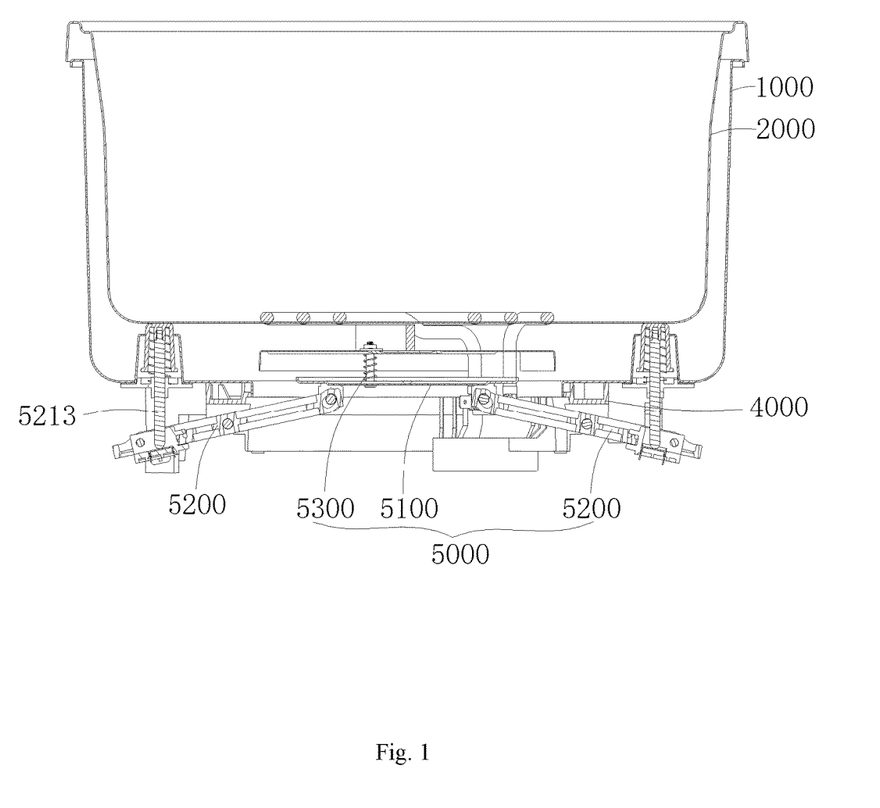
FIG. 1 is a schematic cut-away view of a heating component, in a rising state, of the slow cooker provided by one embodiment of the present invention.
Figure 5:
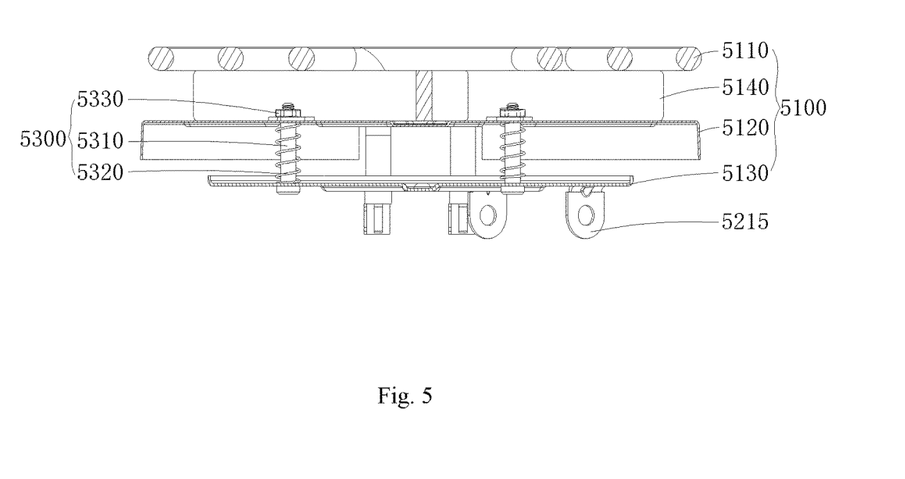
FIG. 5 is a schematic assembled view of a heating component and an automatic alignment mechanism of the slow cooker provided by the embodiment of the present invention.
Figure 6:
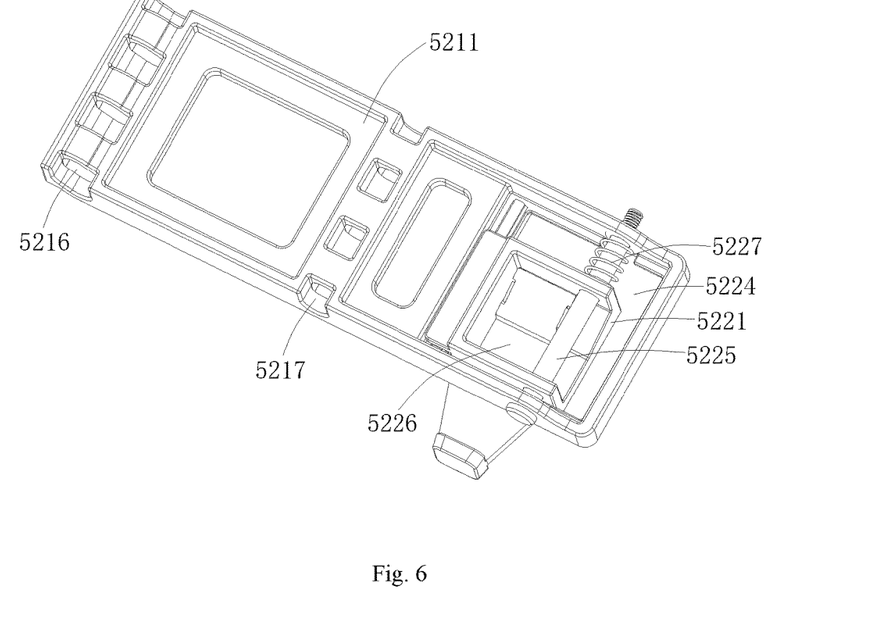
FIG. 6 is a schematic view of a sliding block mounted on a wane of the slow cooker provided by the embodiment of the present invention.

Specifically, as shown in FIG. 1 and FIG. 5, the heating component 5100 includes a heating element 5100, a thermal baffle 5120, and a support 5130 superposed from top to bottom; the heating element 5110 is mounted on the thermal baffle 5120 through a supporting piece 5140, and electrically connected to the control circuit component; an automatic alignment mechanism 5300 is arranged between the thermal baffle 5120 and the support 5130. The thermal baffle 5120 is made of material with properties of low thermal conductivity, high fusion point and non-flammability. The thermal baffle 5120 is disposed between the support 5130 and the heating element 5110 so as to prevent the heat generated by the heating element 5110 from jeopardizing the strength of the support 5130. The heating element 5110 is mounted on the thermal baffle 5120 by the support piece 5140 without any direct contact with the thermal baffle 5120, thereby further reducing the heat conductive to the thermal baffle 5120. The heating element 5110 is attached to the bottom of the inner pot 2000 directly during preheating the inner pot 2000. Therefore, in order to ensure that the upper end face of the heating element 5110 can be properly attached to the bottom of the inner pot 2000, the automatic alignment mechanism 5300 is provided between the thermal baffle 5120 and the support 5130. By the automatic alignment mechanism 5300, the inner pot 2000 can drive the heating element 5110 to be attached to the bottom of the inner pot 2000 with a proper angle automatically after the inner pot 2000 being in place so as to make the heating element 5110 attach to the bottom of the inner pot 2000 properly. The heat conductivity is high efficient and the problem of uneven heating temperature can be avoided.

Specifically, the heating element 5110 is composed of one or more coiled, winded, or side-by-side arranged heating tubes; or the heating element 5110 can be a heating panel. Accordingly, a planar heating surface is formed, which helps heat the bottom of the inner pot 2000 evenly and avoids the defect of overheating partially. In the embodiment, the heating element 5110 is a coiled heating tube which is convenient to manufacture and has low cost and long service life.

Specifically, as shown in FIG. 1 and FIG. 5, the automatic alignment mechanism 5300 includes a guiding shaft 5310 arranged on the support 5130, and a through-hole (not shown) arranged on the thermal baffle 5120 and configured to be passed through by the guiding shaft 5310. The guiding shaft 5310 is sheathed with a spring 5320, and one end of the guiding shaft 5310 passes through the through-hole, the end of the guiding shaft 5310 which passes through the through-hole is connected to a nut 5330. By such arrangement, under the flexible support of the spring 5320 and the guiding and limit actions of the guiding shaft 5310, the thermal baffle 5120 can adjust its position automatically within a certain range, for example, moving up and down, left and right, so as to attach the heating element 5110 to the bottom of the inner pot 2000 properly. At the same time, under the elastic force of the spring 5320, the heating element 5110 can be always attached to the bottom of the inner pot 2000 to ensure the efficiency of the heat conductivity.

Figure 2:
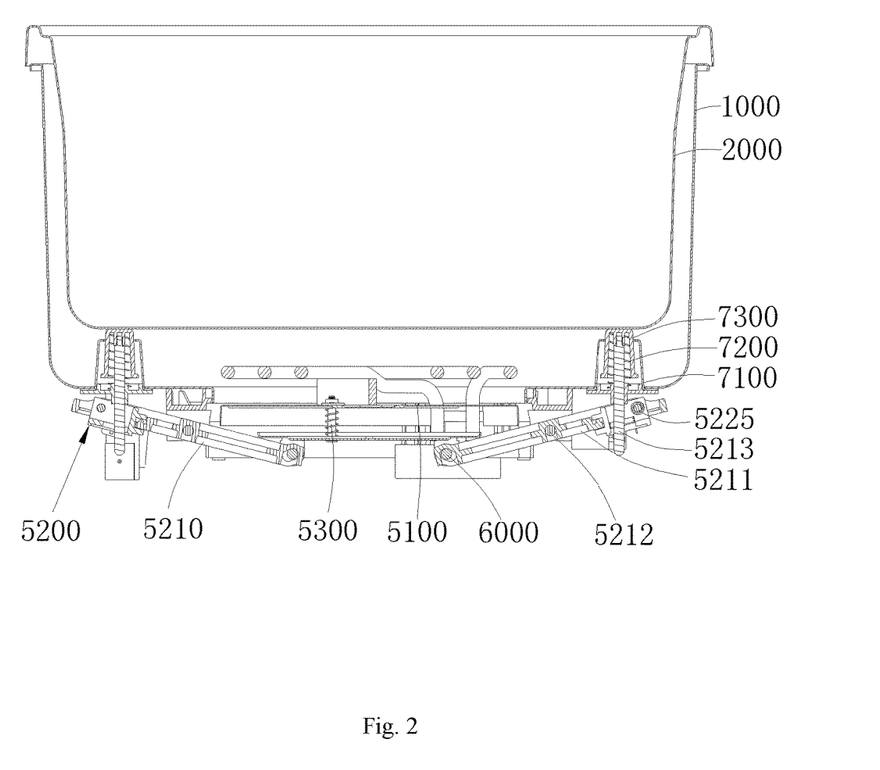
FIG. 2 is a schematic cut-away view of the heating component, in a falling state, of the slow cooker provided by the embodiment of the present invention.
Figure 3:
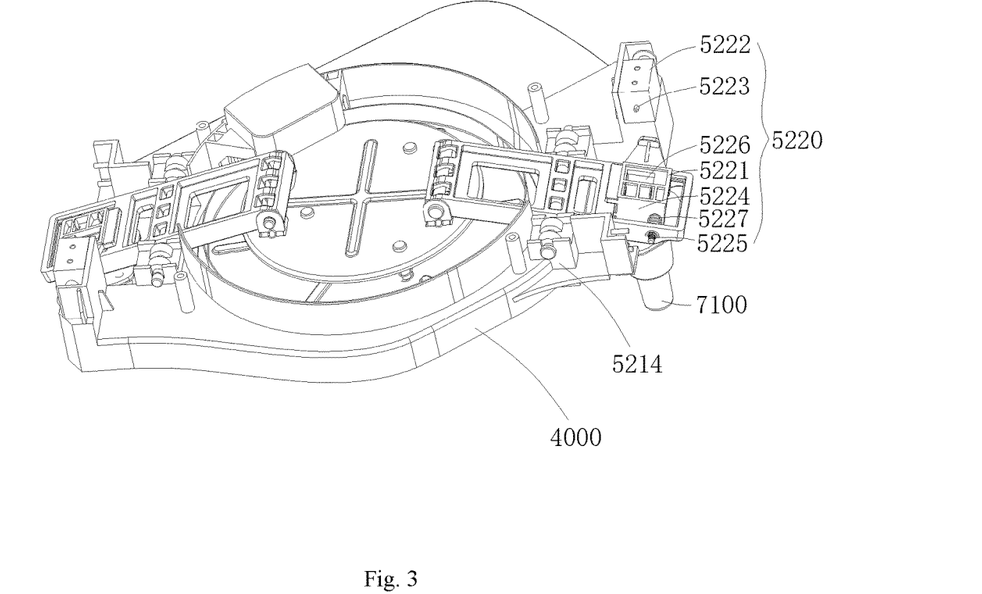
FIG. 3 is a schematic view of a heating apparatus mounted on a mount seat of the slow cooker provided by the embodiment of the present invention.

Specifically, the lifting mechanism 5200 which drives the heating component 5100 upwards and downwards can be a pinion-and-rack mechanism, a sprocket-chain mechanism, or a pulley-sliding rope mechanism, or others. In the embodiment, as shown in FIGS. 1-3, the lifting mechanism 5200 includes lever components 5210 and unlocking components 5220; the lever components 5210 are divided into two groups arranged on the mount seat 4000 diagonally; the unlocking components 5220 are divided into two groups correspondingly. The lever components 5210 can support the heating element 5110, and make the heating element 5110 be attached to the bottom of the inner pot 2000 to heat the inner pot 2000 directly when the heating element 5110 is preheating. The unlocking components 5220 can work on the lever components 5210 when its temperature reaches a predetermined preheating temperature, make the lever component 5210 work, and thus detach the heating element 5110 away from the bottom of the inner pot 2000. The lever components 5210 are divided into two groups, which are arranged on the mount seat 4000 diagonally to balance the heating component 5100 and drive the heating component 5100 upwards and downwards reliably. Thus, the problem of getting stuck is avoided and the functional reliability is high. Since the lever components 5210 are divided into the two groups, the unlocking components 5220 are correspondingly divided into the two groups to ensure the consistency of the two lever components 5210.

Specifically, as shown in FIGS. 1-6, the lever component 5210 includes a wane 5211, a support axle 5212, a compression bar 5213, a support ear 5214 arranged on the mount seat 4000, and a connect ear 5215 oppositely arranged at the bottom of the support 5130. A first axle hole 5216 and a second axle hole 5217 are arranged at one end and a central portion of the wane 5211 respectively. The first axle hole 5216 is passed through by a spindle 6000 of which two ends pass through the connect ear 5215. The support axle 5212 passes through the second axle hole 5217; two ends of the support axle 5212 are mounted on the support ear 5214. One end of the compression bar 5213 presses against the other end of the wane 5211, and the other end of the compression bar 5213 presses against the bottom of the inner pot 2000. By such arrangement, when the inner pot 2000 is in place, the bottom thereof will press the compression lever 5213 downwards, taking the support axle 5212 as a rotation fulcrum. Since the other end of the compression lever 5213 presses against one end of the wane 5211, the wane 5213 will be correspondingly pressed downwards. Therefore, the other end of the wane 5211 will move upwards, taking the support axle 5212 at the middle of the wane 5211 as a rotation fulcrum, so as to elevate the support 5130 connected to the end of the wane 5211 through the spindle 6000, thereby attaching the heating element 5110 to the bottom of the inner pot 2000. The structural design is delicate and has high reliability.

Specifically, as shown in FIG. 1 and FIG. 2, a part of the mount seat 4000 located at a side edge of the bottom of the inner pot 2000 is provided with a compression bar seat 7100 configured to be passed through by the compression bar 5213. The compression bar seat 7100 is provided therein with a compression bar spring 7200 which is passed through by the compression bar 5213. One end of the compression bar 5213 presses against the bottom of the inner pot 2000, while the other end presses against the tip of the wane 5211. When the inner pot 2000 is not in place, one end of the compression bar 5213 does not press against the wane 5211, so the compression bar seat 7100 is provided therein with a compression bar spring 7200 so as to drive the compression bar 5213 to expand and contract, thereby making the compression bar 5213 come back to its original position automatically and driving one end of the wane 5211 to move upwards.

Furthermore, as shown in FIGS. 1-3, the end of the compression bar 5213 which presses against the bottom of the inner pot 2000 is sheathed with a compression bar cap 7300. The unlocking components 5220 are arranged at the end of the compression bar 5213 which presses against the wane 5211. The compression bar cap 7300 increases the contact area between the push bar and the bottom of the inner pot 2000, and prevents the bottom of the inner pot 2000 from being scratched due to the direct contact between the compression bar 5213 and the bottom of the inner pot 2000. The unlocking components 5220 are arranged at the end of the compression bar 5213 which presses against the wane 5211, which is easy to unlock and may realize desirable unlocking effect.

Specifically, as shown in FIGS. 1-6, the unlocking component 5220 includes a sliding block 5221, an electromagnet 5222 and a push bar 5223 disposed inside the electromagnet 5222. One end of the compression bar 5213 presses against the sliding block 5221. The electromagnet 5222 is disposed on the mount seat 4000 arranged at the side of the sliding block 5221. The wane 5221 defines a mount hole 5224 configured to contain the sliding block 5221, the mount hole 5224 is provided therein with a mount axle 5225. The sliding block 5221 is slidingly sheathed around the mount axle 5225. The sliding block 5221 is provided with an unlocking notch 5226 corresponding to one end of the compression bar 5213. A part of the mount axle 5225 arranged between the sliding block 5221 and the mount hole 5224 is sheathed with a reset spring 5227. The sliding block 5221 can slide along the mount axle 5225 freely, in this way, when the support 5130 is moved upwards and the heating element 5110 is attached to the bottom of the inner pot 2000, the compression bar 5213 presses against the sliding block 5221; under this condition, when the temperature of the inner pot 2000 has reached a predetermined preheating value, unlocking is required. Then, the electromagnet 5222 is electrified and drives the inside push bar 5223 protrude so as to push the sliding block 5221 to slide. When the sliding block 5221 is slid to the compression bar 5213 and falls into the unlocking notch 5226 of the sliding block 5221, no action force makes the support 5130 moves upwards, and thus the whole heating component 5100 will fall because of its own weight, thereby detaching the heating element 5110 from the bottom of the inner pot 2000 and realizing the unlocking purpose. When the sliding blocks 5221 slides, it can compress or stretch the reset spring 5227. After the inner pot 2000 is removed, the compression bar 5213 resets to its original position under the force of the compression bar spring 7200, and the end of the compression bar is no longer positioned inside the unlocking the notch 5226. Thus, the sliding block 5221 resets to original state under the force of the reset spring 5227 to prepare for the next process.

Figure 4:
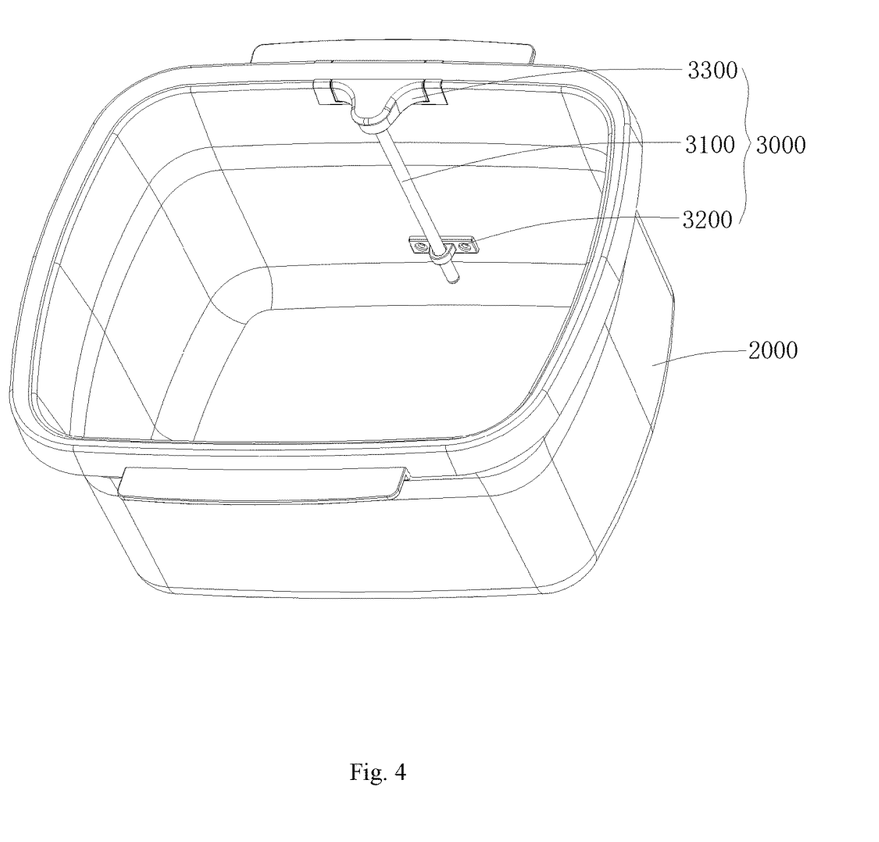
FIG. 4 is a schematic view of a temperature detection component mounted on the inner pot of the slow cooker provided by the embodiment of the present invention.

Specifically, as shown in FIG. 2 and FIG. 4, the temperature detection component 3000 is detachably arranged on the inner sidewall of the inner pot 2000, and includes a temperature sensor 3100 and a socket 3200 configured for holding the temperature sensor 3100. The socket 3200 is fixedly mounted on the inner sidewall of the inner pot 2000. One end of the temperature sensor 3100 is movably plugged in the socket 3200, and the other end is connected to a pothook 3300 which is hooked at an edge of the inner pot 2000. The temperature sensor 3100 is electrically connected to the control circuit component. One end of the temperature sensor 3200 is held by the socket 3200, so that it is ensured that the temperature sensor 3100 is suspended in the inner pot 2000 in a manner of being parallel to a sidewall of the inner pot 2000 and not attached to the sidewall of the inner pot 2000, which ensures the accuracy of the temperature detection. By hooking the temperature sensor 3100 on the side edge of the inner pot 2000 using the pothook 3300, it is convenient to mount the temperature sensor 3100 and remove the temperature sensor 3100 from the inner pot 2000 for cleaning Therefore, the arrangement not only ensures the accuracy of the temperature detection but also helps the convenience of cleaning the inner pot 2000. The electrical connection between the temperature sensor 3100 and the control circuit component can be wired connection or wireless connection, which can be chosen according to specific use requirements.

Specifically, in the embodiment, the inner pot 2000 is a square pot; two corners of the mount seat 4000 are provided with the lever components 5210, and the other two corners are provided with support legs (not shown) configured for supporting the inner pot 2000. The supporting legs provided at the other two corners of the mount seat 4000 can make the inner pot 2000 be stable after being in place. The two support legs can be flexibly scalable, which can form a flat support plane with the two compression bars 5213 after the inner pot 2000 is positioned in place, thereby ensuring the stability of the inner pot 2000. Furthermore, the flexibly scalable support legs can provide buffer when positioning the inner pot 2000, which avoids rigidly collision and is safer to use.

The specifications stated above are just preferred embodiments of the invention, which are not intended to limit the invention. Any amendments, alternatives or improvements within the spirit and principle of the invention should be deemed as included in the scope of the invention.

What is claimed is:
1. A slow cooker, which is for heating and cooking food, comprising a case; a control circuit component and an inner pot for receiving food are disposed inside the case; the inner pot is arranged inside the case in a pick-and-place manner; wherein a temperature detection component for temperature detection is arranged on a sidewall of the inner pot, and a mount seat connected to the case is arranged at a bottom of the inner pot; a liftable heating apparatus is arranged on the mount seat; the heating apparatus comprises a heating component and a lifting mechanism which drives the heating component upwards and downwards;
wherein the heating component includes a support;
wherein the lifting mechanism includes lever components;
wherein the lever component includes a wane, a support axle, a compression bar, a support ear arranged on the mount seat, and a connect ear oppositely arranged at a bottom of the support; a first axle hole and a second axle hole are arranged at one end and a central portion of the wane respectively; the first axle hole is passed through by a spindle of which two ends pass through the connect ear; the support axle passes through the second axle hole; two ends of the support axle are mounted on the support ear; one end of the compression bar presses against the other end of the wane, and the other end of the compression bar presses against the bottom of the inner pot.

2. The slow cooker of claim 1, wherein the heating component further includes a heating element and a thermal baffle, the heating element, the thermal baffle and the support are superposed from top to bottom; the heating element is mounted on the thermal baffle through a supporting piece, and electrically connected to the control circuit component; an automatic alignment mechanism is arranged between the thermal baffle and the support.

3. The slow cooker of claim 2, wherein the automatic alignment mechanism includes a guiding shaft arranged on the support, and a through-hole arranged in the thermal baffle configured to be passed through by the guiding shaft; the guiding shaft is sheathed with a spring, and one end of the guiding shaft passes through the through-hole, one end of the guiding shaft which passes through the through-hole is connected to a nut.

4. The slow cooker of claim 2, wherein the heating element is composed of one or more coiled, winded or side-by-side arranged heating tubes; alternatively, the heating element is a heating panel.

5. The slow cooker of claim 2, wherein the lifting mechanism further includes unlocking components; the lever components are divided into two groups and arranged on the mount seat diagonally; the unlocking components are divided into two groups correspondingly.

6. A slow cooker, which is for heating and cooking food, comprising a case; a control circuit component and an inner pot for receiving food are disposed inside the case; the inner pot is arranged inside the case in a pick-and-place manner; wherein a temperature detection component for temperature detection is arranged on a sidewall of the inner pot, and a mount seat connected to the case is arranged at a bottom of the inner pot; a liftable heating apparatus is arranged on the mount seat; the heating apparatus comprises a heating component and a lifting mechanism which drives the heating component upwards and downwards;
wherein the heating component further includes a heating element, a thermal baffle and a support superposed from top to bottom; the heating element is mounted on the thermal baffle through a supporting piece, and electrically connected to the control circuit component; an automatic alignment mechanism is arranged between the thermal baffle and the support;
wherein the lifting mechanism includes lever components and unlocking components; the lever components are divided into two groups and arranged on the mount seat diagonally; the unlocking components are divided into two groups correspondingly;
wherein the lever component includes a wane, a support axle, a compression bar, a support ear arranged on the mount seat, and a connect ear oppositely arranged at a bottom of the support; a first axle hole and a second axle hole are arranged at one end and a central portion of the wane respectively; the first axle hole is passed through by a spindle of which two ends pass through the connect ear; the support axle passes through the second axle hole; two ends of the support axle are mounted on the support ear; one end of the compression bar presses against the other end of the wane, and the other end of the compression bar presses against the bottom of the inner pot.

7. The slow cooker of claim 6, wherein the mount seat includes a compression bar seat configured to be passed through by the compression bar at an edge of the bottom of the inner pot; the compression bar seat is provided with a compression bar spring inside thereof which is passed through by the compression bar, one end of the compression bar presses against the bottom of the inner pot, while the other end presses against a tip of the wane.

8. The slow cooker of claim 7, wherein the end of the compression bar which presses against the bottom of the inner pot is sheathed with a compression bar cap; the unlocking component is arranged at one end of the compression bar which presses against the wane.

9. The slow cooker of claim 6, wherein the unlocking component includes a sliding block, an electromagnet and a push bar disposed inside the electromagnet; one end of the compression bar presses against the sliding block; the electromagnet is disposed on the mount seat along a side of the sliding block; the wane defines a mount hole configured to contain the sliding block, which mount hole is provided therein with a mount axle; the sliding block is slidingly sheathed around the mount axle; the sliding block is provided with an unlocking notch corresponding to one end of the compression bar; a part of the mount axle arranged between the sliding block and the mount hole is sheathed with a reset spring.

10. The slow cooker of claim 5, wherein the inner pot is a square pot; two corners of the mount seat are provided with lever components, the other two corners are provided with support legs for supporting the inner pot.

11. The slow cooker of claim 1, wherein the temperature detection component is detachably arranged along an inner sidewall of the inner pot, including a temperature sensor and a socket for holding the temperature sensor, which socket is fixedly mounted on the inner sidewall of the inner pot, one end of the temperature sensor is removably plugged in the socket, and the other end is connected to a pothook which is hooked at an edge of the inner pot; the temperature sensor is electrically connected to the control circuit component.

12. The slow cooker of claim 2, wherein the temperature detection component is detachably arranged along an inner sidewall of the inner pot, including a temperature sensor and a socket for holding the temperature sensor, which socket is fixedly mounted on the inner sidewall of the inner pot, one end of the temperature sensor is removably plugged in the socket, and the other end is connected to a pothook which is hooked at an edge of the inner pot; the temperature sensor is electrically connected to the control circuit component.

13. The slow cooker of claim 3, wherein the temperature detection component is detachably arranged along an inner sidewall of the inner pot, including a temperature sensor and a socket for holding the temperature sensor, which socket is fixedly mounted on the inner sidewall of the inner pot, one end of the temperature sensor is removably plugged in the socket, and the other end is connected to a pothook which is hooked at an edge of the inner pot; the temperature sensor is electrically connected to the control circuit component.

14. The slow cooker of claim 4, wherein the temperature detection component is detachably arranged along an inner sidewall of the inner pot, including a temperature sensor and a socket for holding the temperature sensor, which socket is fixedly mounted on the inner sidewall of the inner pot, one end of the temperature sensor is removably plugged in the socket, and the other end is connected to a pothook which is hooked at an edge of the inner pot; the temperature sensor is electrically connected to the control circuit component.

15. The slow cooker of claim 5, wherein the temperature detection component is detachably arranged along an inner sidewall of the inner pot, including a temperature sensor and a socket for holding the temperature sensor, which socket is fixedly mounted on the inner sidewall of the inner pot, one end of the temperature sensor is removably plugged in the socket, and the other end is connected to a pothook which is hooked at an edge of the inner pot; the temperature sensor is electrically connected to the control circuit component.

16. The slow cooker of claim 6, wherein the temperature detection component is detachably arranged along an inner sidewall of the inner pot, including a temperature sensor and a socket for holding the temperature sensor, which socket is fixedly mounted on the inner sidewall of the inner pot, one end of the temperature sensor is removably plugged in the socket, and the other end is connected to a pothook which is hooked at an edge of the inner pot; the temperature sensor is electrically connected to the control circuit component.

17. The slow cooker of claim 7, wherein the temperature detection component is detachably arranged along an inner sidewall of the inner pot, including a temperature sensor and a socket for holding the temperature sensor, which socket is fixedly mounted on the inner sidewall of the inner pot, one end of the temperature sensor is removably plugged in the socket, and the other end is connected to a pothook which is hooked at an edge of the inner pot; the temperature sensor is electrically connected to the control circuit component.

18. The slow cooker of claim 8, wherein the temperature detection component is detachably arranged along an inner sidewall of the inner pot, including a temperature sensor and a socket for holding the temperature sensor, which socket is fixedly mounted on the inner sidewall of the inner pot, one end of the temperature sensor is removably plugged in the socket, and the other end is connected to a pothook which is hooked at an edge of the inner pot; the temperature sensor is electrically connected to the control circuit component.

19. The slow cooker of claim 9, wherein the temperature detection component is detachably arranged along an inner sidewall of the inner pot, including a temperature sensor and a socket for holding the temperature sensor, which socket is fixedly mounted on the inner sidewall of the inner pot, one end of the temperature sensor is removably plugged in the socket, and the other end is connected to a pothook which is hooked at an edge of the inner pot; the temperature sensor is electrically connected to the control circuit component.

\* \* \* \* \*